United States Patent
Dlugoss et al.

(10) Patent No.: US 8,150,586 B2
(45) Date of Patent: Apr. 3, 2012

(54) METHOD FOR SYNCHRONIZED TRANSMISSION GEAR RATIO ENGAGEMENT

(75) Inventors: Randall B. Dlugoss, Royal Oak, MI (US); Kurt Mitts, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 461 days.

(21) Appl. No.: 12/427,917

(22) Filed: Apr. 22, 2009

(65) Prior Publication Data

US 2010/0274453 A1    Oct. 28, 2010

(51) Int. Cl.
    *G06F 19/00*  (2006.01)
(52) U.S. Cl. ......................................................... 701/51
(58) Field of Classification Search ............... 701/51, 701/64, 95; 477/34
    See application file for complete search history.

(56) References Cited

U.S. PATENT DOCUMENTS

| | | | | |
|---|---|---|---|---|
| 6,129,187 A | * | 10/2000 | Bellanger et al. | 192/3.58 |
| 6,790,159 B1 | * | 9/2004 | Buchanan et al. | 477/86 |
| 6,819,997 B2 | * | 11/2004 | Buchanan et al. | 701/67 |
| 2004/0166992 A1 | * | 8/2004 | Buchanan et al. | 477/181 |

* cited by examiner

*Primary Examiner* — Yonel Beaulieu
(74) *Attorney, Agent, or Firm* — Quinn Law Group, PLLC

(57) ABSTRACT

A method is provided for changing a gear ratio in a transmission of a motor vehicle. Engagement of a first gear-train component with a second gear-train component is initiated at a predetermined rate. Rotational speeds of the first and the second gear-train components, and whether the rotational speed of the first gear-train component and the rotational speed of the second gear-train component have substantially synchronized is determined. A rate of engagement of the two gear-train components is reduced, if the rotational speed of the first gear-train component has not substantially synchronized with rotational speed of the second gear-train component. The rate of engagement of the two gear-train components is increased, if the rotational speed of the first gear-train component has substantially synchronized with rotational speed of the second gear-train component. Following the conclusion of engagement between the two gear-train components, the gear ratio change is completed.

19 Claims, 2 Drawing Sheets

METHOD FOR SYNCHRONIZED TRANSMISSION GEAR RATIO ENGAGEMENT

TECHNICAL FIELD

The present invention relates to a vehicle transmission, and, more particularly, to synchronized engagement of transmission gear ratios.

BACKGROUND OF THE INVENTION

A majority of motor vehicle transmissions have multiple, discrete gear ratios used to provide a mechanical advantage in powering the vehicle.

Some transmissions configured with discrete gear ratios are designed to be shifted between the ratios manually, i.e. by a vehicle operator. Other transmissions are designed to be shifted fully automatically, under the direction of a specially programmed electronic controller. There are also semi-automatic transmissions that may either be shifted entirely automatically by the controller, or whose shifting may be directed by the operator. A dual-clutch transmission (DCT) is one example of a semi-automatic type.

During design and development of a vehicle drivetrain, quality of transmission ratio changes typically commands particular attention. Such attention is generally warranted because interruption and resumption of engine torque flow during the shift may generate driveline disturbances and reduce comfort of the vehicle occupants.

SUMMARY OF THE INVENTION

In view of the foregoing, a method for changing a gear ratio in a vehicle transmission is provided. The method includes initiating engagement of a first gear-train component with a second gear-train component at a predetermined rate to commence the gear ratio change. According to the method, rotational speeds of the first and the second gear-train components, and whether the rotational speed of the first gear-train component and the rotational speed of the second gear-train component have substantially synchronized are also determined. The determination of the rotational speed of the first gear-train component may be accomplished by a first speed sensor, while the determination of the rotational speed of the second gear-train component may be accomplished by a second speed sensor. A rate of engagement of the two gear-train components is reduced, if the rotational speed of the first gear-train component has not substantially synchronized with rotational speed of the second gear-train component. Conversely, the rate of engagement of the two gear-train components is increased, if the rotational speed of the first gear-train component has substantially synchronized with rotational speed of the second gear-train component. Subsequently, the gear ratio change is completed.

According to the method, a controller may direct initiating engagement of a first gear-train component with a second gear-train component at a predetermined rate, determining rotational speed of the first gear-train component, determining rotational speed of the second gear-train component, determining whether the rotational speed of the first gear-train component and the rotational speed of the second gear-train component have substantially synchronized, reducing the rate of engagement of the first gear-train component with the second gear-train component, increasing the rate of engagement of the first gear-train component with the second gear-train component, and completing the gear ratio change.

The rotational speed of the first gear-train component and the rotational speed of the second gear-train component may be deemed to be substantially synchronized when the rotational speed of first gear-train component and the rotational speed of the second gear-train component are within a predetermined maximum difference.

The engagement of the first gear-train component with the second gear-train component may be accomplished via a force applied by an actuator, and reducing the rate of engagement of the first gear-train component with the second gear-train component may be accomplished by reducing the force applied by the actuator. Conversely, increasing the rate of engagement of the first gear-train component with the second gear-train component may be accomplished by increasing the force applied by the actuator. The actuator may be a hydraulic pressure device, a solenoid, or an electric motor configured to displace one of the first and the second gear-train components.

The above method may be employed to control a multi-speed dual-clutch (DCT) transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
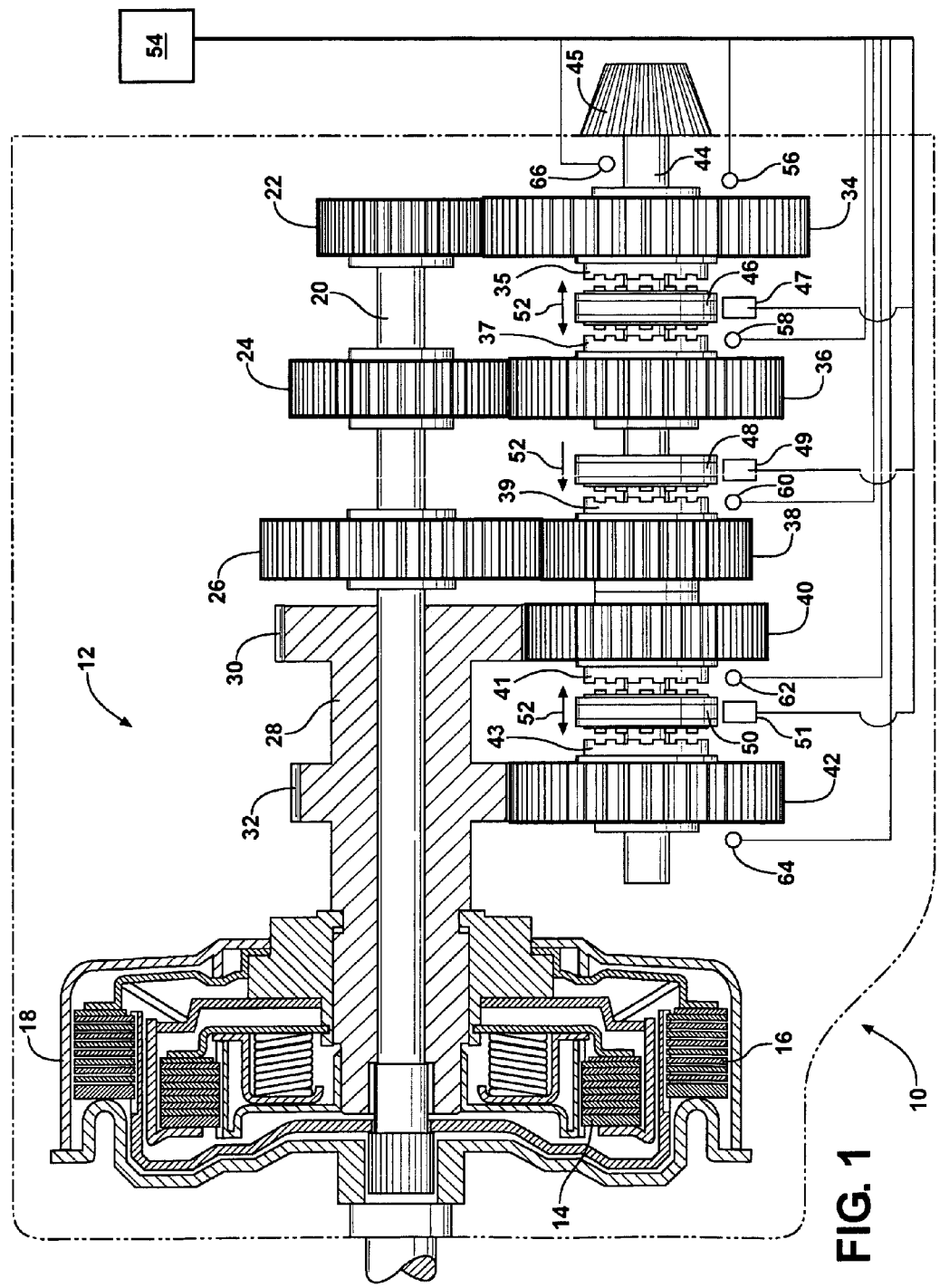
FIG. 1 is a schematic partially cross-sectional representation of a dual-clutch semi-automatic transmission (DCT) controlled by a controller.

Referring to the drawings in which like elements are identified with identical numerals throughout, FIG. 1 depicts inner workings of five-speed dual-clutch (DCT) semi-automatic transmission 10, as typically employed in a vehicle driveline. The DCT 10 includes a gear-train 12, a first clutch 14, and a second clutch 16. The first clutch 14 and the second clutch 16 may be either wet or dry type, as is understood by those skilled in the art. Gear-train 12, first clutch 14 and second clutch 16 are generally enclosed in a transmission case (not shown). The first clutch 14 and the second clutch 16 are additionally housed inside a clutch case 18 for protection from external debris, as well as for retention of a specially formulated fluid if the first and second clutches are wet type.

The gear-train 12 includes multiple components, such as shafts, intermeshing gears mounted on the shafts, and synchronizer assemblies selectively engageable with the gears (described in detail below). The gear-train 12 is arranged to transfer drive torque from an engine (not shown) of the vehicle to vehicle drive wheels (not shown). The gear-train 12 components are capable of being engaged in a variety of combinations in order to establish discrete ratio steps and provide efficient vehicle propulsion. In particular, the gear-train 12 includes an inner input shaft 20. Rigidly mounted on the input shaft 20 are gears 22, 24, and 26, for rotation therewith. Input shaft 20 is engaged for rotation with the engine by engaging the first clutch 14. Gear-train 12 also includes a sleeve input shaft 28 which is mounted concentrically on the outside of the input shaft 20. The sleeve input shaft 28 is engaged for rotation with the engine by engaging a second clutch 16. Rigidly mounted on the sleeve input shaft 28 are gears 30 and 32, for rotation therewith. The input shaft 20 and the sleeve input shaft 28 are configured to rotate freely with respect to one another, as understood by those skilled in the art.

Odd-numbered gears, first gear 34, third gear 36, and fifth gear 38, as well as even-numbered gears, fourth gear 40, and second gear 42, are rotatably mounted on an output shaft 44. First gear 34 meshes with gear 22, third gear 36 meshes with gear 24 and fifth gear 38 meshes with gear 26 thereby establishing an odd-numbered gear-train, while fourth gear 40 meshes with gear 30 and second gear 42 meshes with gear 32, thereby establishing an even numbered gear-train within the meaning of the embodiment. Output shaft 44 is mechanically engaged with the drive wheels for powering the vehicle via a differential, represented by gear 45. Additionally, mounted on the output shaft 44 are blocker-ring/synchronizer assemblies 46 and 48 for synchronized engagement of gears 34, 36 and 38, and blocker-ring/synchronizer 50 for synchronized engagement of gears 40 and 42. The blocker-ring/synchronizer assemblies 46, 48 and 50 are splined to the output shaft 44 for synchronous rotation therewith. The blocker-ring/synchronizer assemblies 46, 48 and 50 are axially displaceable or translatable along the output shaft 44 when urged by an appropriate actuator (as described below) to contact the corresponding gear 34, 36, 38, 40, or 42.

Blocker-ring/synchronizer assembly 46 is translated by actuator 47, blocker-ring/synchronizer assembly 48 is translated by actuator 49, and blocker-ring/synchronizer assembly 50 is translated by actuator 51. Axial translation of the blocker-ring/synchronizer assemblies 46, 48 and 50 is represented by arrows 52. Each of the actuators 47, 49 and 51 may be a hydraulic pressure device, a magnetic solenoid, or an electrical motor, as understood by those skilled in the art. Blocker-ring/synchronizer assemblies 46, 48 and 50 are generally constructed according to known design practices, as understood by those skilled in the art. During a gear ratio change in the DCT 10, an actuator, such as 47, 49, or 51, applies a force axially along the output shaft 44 to translate a blocker-ring/synchronizer assembly, such as 46, 48 or 50.

When a blocker-ring/synchronizer assembly, such as 46, 48 or 50, is translated axially along the output shaft 44 for contact with the appropriate gear, the synchronizer initially increases rotational speed of the gear being selected (34, 36, 38, 40 or 42) to substantially synchronize rotation of the gear with rotation of the output shaft 44. The blocker-ring/synchronizer assembly, such as 46, 48 or 50, increases rotation of the respective gear through the use of complementary cone clutch surfaces (not shown), as understood by those skilled in the art. Following the substantial synchronization of rotational speeds of output shaft 44 and the gear being selected, the blocker-ring/synchronizer assembly mechanically meshes with a complementary toothed feature 35 on gear 34, toothed feature 37 on gear 36, toothed feature 39 on gear 38, toothed feature 41 on gear 40 and toothed feature 43 on gear 42. Once a blocker-ring/synchronizer assembly is meshed with a corresponding gear, that particular gear becomes rotationally locked to the output shaft 44.

Gear ratio changes in DCT 10, as described above, are controlled by a specially programmed controller 54. Controller 54 is arranged on the vehicle, and may be fastened to the case of the DCT 10 by any known methods. Control of gear ratios is accomplished via computations based on known gear ratios and/or based on signal inputs to the controller 54 from a variety of speed sensors. As shown, such speed sensors may include a speed sensor 56 for gear 34, a speed sensor 58 for gear 36, a speed sensor 60 for gear 38, a speed sensor 62 for gear 40, a speed sensor 64 for gear 42, a speed sensor 66 for output shaft 44, as well as an engine speed sensor (not shown). Sensors 56, 58, 60, 62, 64 and 66 may be fixed to the transmission case in order to provide reliable positioning relative to the gear-train 12. Actuators 47, 49 and 51 are in electrical communication with the controller 54. Controller 54 is programmed to vary, by either increasing or reducing a force on the blocker-ring/synchronizer 46, 48 or 50 via actuators 47, 49 and 51 to adjust the rate of engagement between a particular blocker-ring/synchronizer and a respective gear. Such varying of the rate of engagement between the blocker-ring/synchronizer and the respective gear also alters the time required to affect a desired gear ratio change. Control of gear ratios may be accomplished by the controller 54 either entirely automatically, or semi-automatically, where ratio control is consistent with input from the vehicle operator.

As an example of a gear ratio change in the DCT 10, a change from a first gear ratio to a second gear ratio is illustrated below. DCT 10 is typically in first gear ratio when the vehicle is launched from rest. Launch from rest is accomplished by engaging the clutch 14 with the blocker-ring/synchronizer assembly 46 translated by actuator 47 to engage first gear 34. While the vehicle is in first gear ratio, second clutch 16 remains disengaged, and the controller 54 continuously receives signals from the speed sensors 56, 58, 60, 62, 64 and 66. Based on the received speed data and/or on computations derived from known first and second gear ratios, controller 54 determines when a shift into second gear ratio is appropriate. When such a determination is made, controller 54 commands actuator 51 to pre-select second gear 42 by translating blocker-ring/synchronizer assembly 50 toward the second gear.

During engagement of blocker-ring/synchronizer assembly 50 and second gear 42, the controller continuously monitors the difference in their rotational speeds. If controller 54 determines that the rotational speeds of blocker-ring/synchronizer assembly 50 and second gear 42 have not substantially synchronized, the force imparted by the actuator 51 is reduced. The reduction of the force on actuator 51 reduces the rate of engagement between blocker-ring/synchronizer assembly 50 and second gear 42, and, consequently, increases the time required to complete the change from the first gear ratio to the second gear ratio. If, on the other hand, controller 54 determines that the rotational speeds of blocker-ring/synchronizer assembly 50 and second gear 42 have substantially synchronized, the force imparted by the actuator 51 is increased. The increased force on actuator 51 speeds up the rate of engagement, which leads to mechanical meshing between blocker-ring/synchronizer assembly 50 and the toothed feature 43 within a reduced time frame. As the engagement between blocker-ring/synchronizer assembly 50 and second gear 42 is concluded, controller 54 directs the first clutch 14 to disengage, while simultaneously directing the second clutch 16 to engage. Once the second clutch 16 has been fully engaged, the ratio shift from first gear 34 to second gear 42 is complete. Following the completion of the shift from first to second ratio, controller 54 directs actuator 47 to translate blocker-ring/synchronizer assembly 46 away from first gear 34 and toward third gear 36, in order to initiate pre-selection of the third gear ratio.

The rotational speeds of gear-train components being engaged (one of gears 34, 36, 38, 40 or 42, and output shaft 44) become substantially synchronized when the difference in speeds between these components is within a predetermined maximum allowable magnitude. Such maximum allowable magnitude is typically indicative of a difference in speed that can be withstood without structurally detrimental effect to the meshing gear-train components as their mechanical engagement is instituted. Additionally, gear-train component speeds are considered to be substantially synchronized when completing a ratio shift at those component speeds would not cause a drivetrain disturbance considered objectionable by vehicle operator and/or passengers. Typically, the maximum allowable speed difference that constitutes substantial synchronization of the output shaft 44 and the appropriate gear is predetermined during design and development of a particular transmission.

Figure 2:
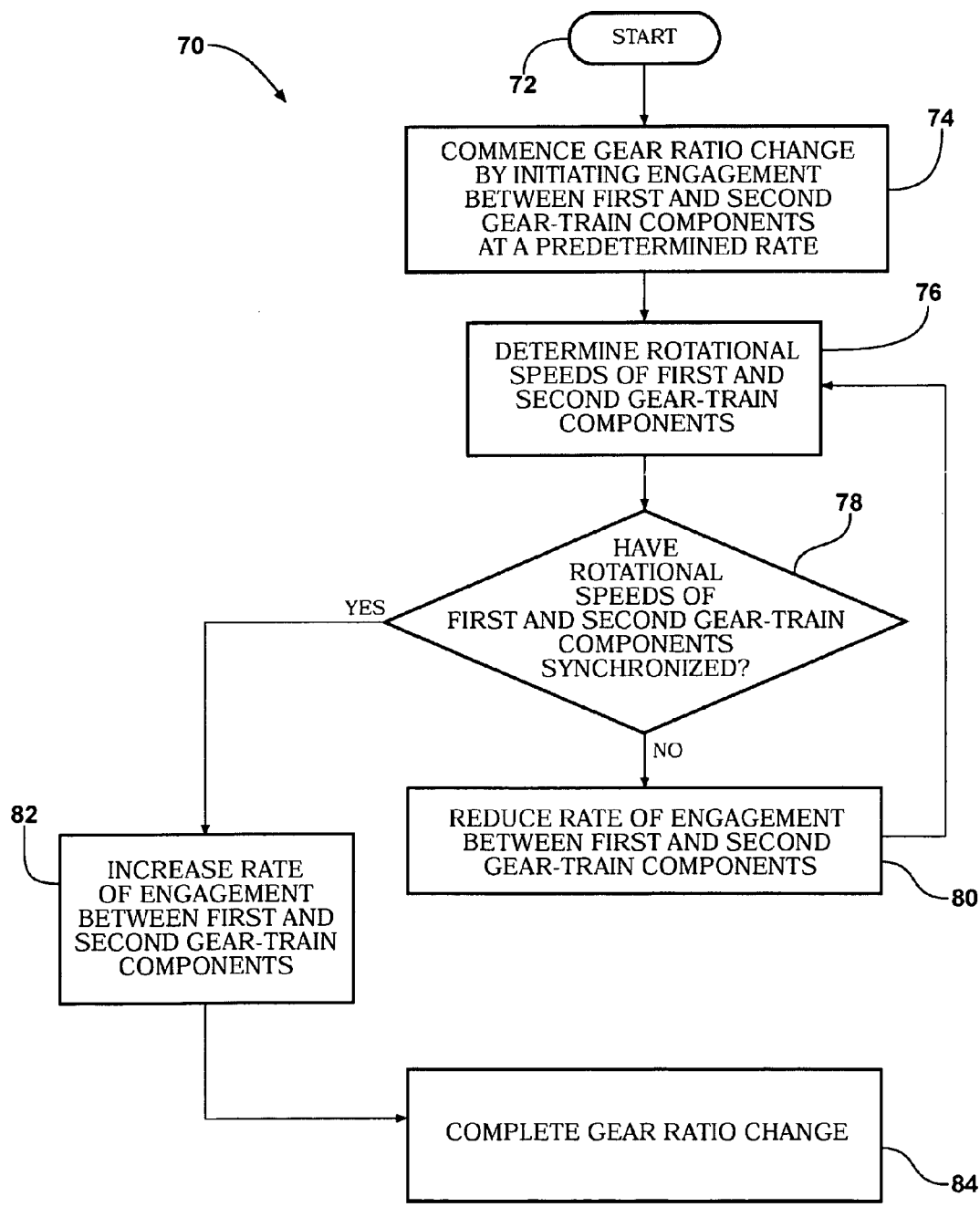
FIG. 2 is a flow chart illustrating a method for synchronized gear ratio engagement in a transmission employed within a vehicle powertrain.

FIG. 2 depicts a method 70 for controlling gear ratio changes in the DCT 10 shown in FIG. 1. The method 70 is described with reference to FIG. 1 and the above description of the DCT 10. The method commences at block 72, and then proceeds to block 74 to commence a gear ratio change. In block 74 engagement between a first gear-train component, one of the blocker-ring/synchronizers 46, 48 and 50, and a corresponding second gear-train component, one of the gears 34, 36, 38, 40 and 42, is initiated at a predetermined rate that is directed by controller 54. The method then advances to block 76. In block 76, rotational speed of the first gear-train component is determined, i.e. sensed, by one of the sensors 56, 58, 60, 62 and 64 and the rotational speed of the second gear-train component is determined by sensor 66. The method then proceeds to block 78. In block 78, whether rotational speeds of the first and of the second gear-train components have substantially synchronized is determined by controller 54, as described above with respect to FIG. 1.

If in frame 78 it is determined that rotational speeds of the first and of the second gear-train components have not substantially synchronized, the method proceeds to frame 80. In frame 80 the rate of engagement between the first and the second gear-train components is reduced by controller 54, following which, the method loops back to frame 76. If in frame 78 it is determined that rotational speeds of the first and of the second gear-train components have substantially synchronized, the method proceeds to frame 82. In frame 82 the rate of engagement between the first and the second gear-train components is increased by controller 54. Following frame 82, the method proceeds to frame 84, where engagement between the first and the second gear-train components is concluded, and the gear ratio change is completed via direction of controller 54. The method 70 functions continuously according to the preceding description while the DCT 10 is employed to transmit engine torque to the drive wheels, and every time a gear ratio change is summoned by the controller 54.

While the best modes for carrying out the invention have been described in detail, those familiar with the art to which this invention relates will recognize various alternative designs and embodiments for practicing the invention within the scope of the appended claims.

The invention claimed is:

1. A method for changing a gear ratio in a transmission of a motor vehicle, comprising:
   commencing the gear ratio change by initiating engagement of a first gear-train component with a second gear-train component at a predetermined rate;
   determining rotational speed of the first gear-train component;
   determining rotational speed of the second gear-train component;
   determining whether the rotational speed of the first gear-train component and the rotational speed of the second gear-train component have substantially synchronized;
   reducing the rate of engagement of the first gear-train component with the second gear-train component if the rotational speed of the first gear-train component has not substantially synchronized with rotational speed of the second gear-train component;
   increasing the rate of engagement of the first gear-train component with the second gear-train component if the rotational speed of the first gear-train component has substantially synchronized with rotational speed of the second gear-train component; and
   completing the gear ratio change.

2. The method of claim 1, wherein said determining of the rotational speed of the first gear-train component is accomplished by a first speed sensor, and the determining of the rotational speed of the second gear-train component is accomplished by a second speed sensor.

3. The method of claim 1, wherein said initiating engagement of the first gear-train component with the second gear-train component at a predetermined rate, said determining rotational speed of the first gear-train component, said determining rotational speed of the second gear-train component, said determining whether the rotational speed of the first gear-train component and the rotational speed of the second gear-train component have substantially synchronized, said reducing the rate of engagement of the first gear-train component with the second gear-train component, said increasing the rate of engagement of the first gear-train component with the second gear-train component; and said completing the gear ratio change are directed by a controller.

4. The method of claim 1, wherein the rotational speed of the first gear-train component and the rotational speed of the second gear-train component have substantially synchronized when the rotational speed of first gear-train component and the rotational speed of the second gear-train component are within a predetermined maximum difference.

5. The method of claim 1, wherein the engagement of the first gear-train component with the second gear-train component is accomplished via a force applied by an actuator.

6. The method of claim 5, wherein said reducing the rate of engagement of the first gear-train component with the second gear-train component is accomplished by reducing the force applied by the actuator, and said increasing the rate of engagement of the first gear-train component with the second gear-train component is accomplished by increasing the force applied by the actuator.

7. The method of claim 5, wherein the actuator is a hydraulic pressure device configured to displace one of the first and the second gear-train components.

8. The method of claim 7, wherein the actuator is a solenoid configured to displace one of the first and the second gear-train components.

9. The method of claim 7, wherein the actuator is an electric motor configured to displace one of the first and the second gear-train components.

10. A method for controlling a multi-speed dual-clutch transmission comprising:
   holding a first clutch engaged, wherein a first transmission input member is coupled to a transmission output member while a second clutch engageable to couple a second transmission input member to the output member remains disengaged;
   commencing the gear ratio change by initiating engagement of a first gear-train component with a second gear-train component at a predetermined rate;
   determining rotational speed of the first gear-train component;
   determining rotational speed of the second gear-train component;

determining whether the rotational speed of the first gear-train component and the rotational speed of the second gear-train component have substantially synchronized;

reducing the rate of engagement of the first gear-train component with the second gear-train component if the rotational speed of the first gear-train component has not substantially synchronized with rotational speed of the second gear-train component;

increasing the rate of engagement of the first gear-train component with the second gear-train component if the rotational speed of the first gear-train component has substantially synchronized with rotational speed of the second gear-train component to conclude engagement of the first gear-train component with the second gear-train component; and disengaging the first clutch and engaging the second clutch, whereby the second transmission input member is coupled to the output member.

11. The method of claim 10, wherein said determining of the rotational speed of the first gear-train component is accomplished by a first speed sensor, and said determining of the rotational speed of the second gear-train component is accomplished by a second speed sensor.

12. The method of claim 10, wherein said commencing the gear ratio change, said determining rotational speed of the first gear-train component, said determining rotational speed of the second gear-train component, said determining whether the rotational speed of the first gear-train component and the rotational speed of the second gear-train component have substantially synchronized, said reducing the rate of engagement of the first gear-train component with the second gear-train component, said increasing the rate of engagement of the first gear-train component with the second gear-train component, and said disengaging the first clutch and engaging the second clutch are directed by a controller.

13. The method of claim 10, wherein the rotational speed of the first gear-train component and the rotational speed of the second gear-train component have substantially synchronized when the rotational speed of first gear-train component and the rotational speed of the second gear-train component are within a predetermined maximum difference.

14. The method of claim 10, wherein the engagement of the first gear-train component with the second gear-train component is accomplished via a force applied by an actuator.

15. The method of claim 14, wherein said reducing the rate of engagement of the first gear-train component with the second gear-train component is accomplished by reducing the force applied by the actuator, and said increasing the rate of engagement of the first gear-train component with the second gear-train component is accomplished by increasing the force applied by the actuator.

16. The method of claim 14, wherein the actuator is a hydraulic pressure device configured to displace one of the first and the second gear-train components.

17. The method of claim 14, wherein the actuator is a solenoid configured to displace one of the first and the second gear-train components.

18. The method of claim 14, wherein the actuator is an electric motor configured to displace one of the first and the second gear-train components.

19. A method for changing a gear ratio in a transmission having a first gear-train component and a second gear-train component, comprising:

reducing the rate of engagement of the first gear-train component with the second gear-train component if the rotational speed of the first gear-train component has not substantially synchronized with rotational speed of the second gear-train component;

increasing the rate of engagement of the first gear-train component with the second gear-train component if the rotational speed of the first gear-train component has substantially synchronized with rotational speed of the second gear-train component; and completing the gear ratio change.

\* \* \* \* \*